(12) United States Patent
Liu et al.

(10) Patent No.: US 8,064,001 B2
(45) Date of Patent: Nov. 22, 2011

(54) LIQUID CRYSTAL DISPLAY PANEL AND PIXEL STRUCTURE THEREOF

(75) Inventors: Sung-Kao Liu, Hsin-Chu (TW); Hsiang-Lin Lin, Hsin-Chu (TW); Ching-Huan Lin, Hsin-Chu (TW); Chih-Jen Hu, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 472 days.

(21) Appl. No.: 12/419,305

(22) Filed: Apr. 7, 2009

(65) Prior Publication Data
US 2010/0053483 A1  Mar. 4, 2010

(30) Foreign Application Priority Data
Sep. 1, 2008 (TW) .............................. 97133461 A

(51) Int. Cl.
*G02F 1/133* (2006.01)
*G02F 1/1337* (2006.01)
*G09G 3/36* (2006.01)
(52) U.S. Cl. ......................................... 349/33; 349/139
(58) Field of Classification Search .................... 345/92; 257/21, 25; 349/33, 36, 78, 129, 131, 132, 349/134, 138, 139
See application file for complete search history.

(56) References Cited

U.S. PATENT DOCUMENTS

| | | | |
|---|---|---|---|
| 5,710,611 A * | 1/1998 | Suzuki et al. | 349/129 |
| 6,992,329 B2 | 1/2006 | Wu et al. | |
| 7,209,201 B2 * | 4/2007 | Lin et al. | 349/129 |
| 2001/0040656 A1 * | 11/2001 | Na et al. | 349/110 |
| 2002/0047961 A1 * | 4/2002 | Kwag et al. | 349/110 |
| 2005/0200777 A1 | 9/2005 | Nagano et al. | |
| 2006/0145987 A1 | 7/2006 | Hong | |
| 2009/0180065 A1 * | 7/2009 | Chan et al. | 349/110 |
| 2009/0323002 A1 * | 12/2009 | Wang et al. | 349/139 |

FOREIGN PATENT DOCUMENTS
CN  1916738 A  2/2007
TW  200804939  1/2008
* cited by examiner

*Primary Examiner* — Akm Ullah
(74) *Attorney, Agent, or Firm* — Winston Hsu; Scott Margo

(57) ABSTRACT

A pixel structure includes at least a pixel electrode, and at least an aligning electrode. The pixel electrode, which has a central opening, is disposed on a substrate. The aligning electrode, which is disposed between the pixel electrode and substrate, includes an aligning part disposed under and corresponding to the central part of the pixel electrode. The aligning voltage applied to the aligning electrode is greater than the pixel voltage applied to the pixel electrode.

29 Claims, 11 Drawing Sheets

LIQUID CRYSTAL DISPLAY PANEL AND PIXEL STRUCTURE THEREOF

BACKGROUND OF THE INVENTION

1. Field of the Invention

The present invention relates to a pixel structure of a liquid crystal display panel, and more particularly, to a pixel structure of a multi-domain vertical alignment liquid crystal display (MVA LCD) panel having an aligning electrode.

2. Description of the Prior Art

Liquid crystal displays (LCDs) have been commonly utilized in various electronic products including cell phones, personal digital assistants (PDAs), and notebook computers. As the market demand for large-scale display panels continues to increase, LCDs become more and more important due to the advantages e.g. small size and light weight. In fact, LCDs have gradually replaced the conventional cathode ray tube (CRT) displays that had dominated the market for so many years. However, the conventional LCD suffers from narrow viewing angle, which limits its application. As a result, multi-domain vertical alignment (MVA) display capable of orientating liquid crystals in various directions has been proposed to address the narrow viewing angle problem.

With reference to FIG. 1, FIG. 1 is a schematic diagram illustrating a pixel structure of an MVA LCD panel according to the prior art. As illustrated in FIG. 1, the pixel structure 10 of a conventional MVA LCD panel includes a first substrate 12, a second substrate 14 and a liquid crystal layer 16. The liquid crystal layer 16 is interposed between the first substrate 12 and the second substrate 14. A pixel electrode 18 is disposed on the first substrate 12. A color filter 20, a common electrode 22 and an alignment protrusion 24 are disposed on the second substrate 14. The liquid crystal layer 16 can be aligned in multiple directions due to the additional arrangement of the alignment protrusion 24. Besides, a black matrix pattern layer 26 is additionally disposed on the second substrate 14 and corresponding to the alignment protrusion 24 so as to shield the light leakage generated on the periphery of the alignment protrusion 24.

Conventionally, the pixel structure 10 utilizing the alignment protrusion 24 to implement multi-domain alignment has the following disadvantages: First, the manufacturing process cost will increase due to the step of further forming the alignment protrusion 24 on the second substrate 14; In addition, the size of the black matrix pattern layer 26 must be greater than that of the alignment protrusion 24 so as to efficiently shield the light leakage generated on the periphery of the alignment protrusion 24. However, the aperture ratio is sacrificed accordingly. Furthermore, the size of the alignment protrusion 24 is limited by the manufacturing process limitation, and therefore the installation of alignment protrusion 24 in a high-resolution LCD panel would accordingly lower the aperture ratio.

SUMMARY OF THE INVENTION

It is therefore one of the objects of the present invention to provide a pixel structure of an MVA LCD panel so as to improve multi-domain alignment ability and increase the aperture ratio.

To achieve the above-mentioned object, the present invention provides a pixel structure disposed on a substrate. The pixel structure includes at least a pixel electrode, at least a common electrode and at least an aligning electrode. The pixel electrode disposed on the substrate has a central opening. The common electrode is disposed on the periphery of the pixel electrode of the substrate. The aligning electrode disposed between the pixel electrode and the substrate comprises an aligning part disposed under and corresponding to the central opening. The aligning voltage applied to the aligning electrode is greater than the pixel voltage applied to the pixel electrode.

To achieve the above-mentioned object, the present invention provides a pixel structure disposed on a substrate. The pixel structure includes at least a pixel electrode and at least an aligning electrode. The pixel electrode disposed on the substrate has a central opening. The aligning electrode disposed between the pixel electrode and the substrate includes an aligning part disposed under and corresponding to the central opening. The aligning voltage applied to the aligning electrode is greater than the pixel voltage applied to the pixel electrode.

To achieve the aforementioned object, the present invention provides an LCD panel including: a first substrate, a second substrate and a liquid crystal layer. The first substrate includes at least a pixel electrode, at least a first common electrode and at least an aligning electrode. The pixel electrode disposed on the first substrate has a central opening. The first common electrode is disposed on the periphery of the pixel electrode of the first substrate. The aligning electrode disposed between the pixel electrode and the first substrate includes an aligning part disposed under and corresponding to the central opening. The aligning voltage applied to the aligning electrode is greater than the pixel voltage applied to the pixel electrode. The second substrate is disposed opposite to the first substrate and includes a second common electrode corresponding to the pixel electrode. The liquid crystal layer is disposed between the first substrate and the second substrate.

Since the pixel structure of the LCD panel of the present invention utilizes the aligning electrode for multi-domain alignment, the installation of the alignment protrusion is needless. Moreover, the pixel structure utilizes the first common electrode to implement the alignment on the fringe of the pixel structure, and therefore a better overall alignment effect and a quicker response time can be achieved. The arrangement of the first common electrode can diminish the size of the aligning electrode and increase the aperture ratio of the pixel structure. Besides, since the manufacturing process limitation of both the aligning electrode and the pixel electrode is higher than that of the alignment protrusion, the resolution is not influenced when the aligning electrode is arranged in a high-resolution LCD panel.

These and other objectives of the present invention will no doubt become obvious to those of ordinary skill in the art after reading the following detailed description of the preferred embodiment that is illustrated in the various figures and drawings.

DETAILED DESCRIPTION

To provide a better understanding of the presented invention, several preferred embodiments will be detailed as follows. The preferred embodiments of the present invention are illustrated in the accompanying drawings with numbered elements to elaborate the contents and effects to be achieved.

Figure 1:
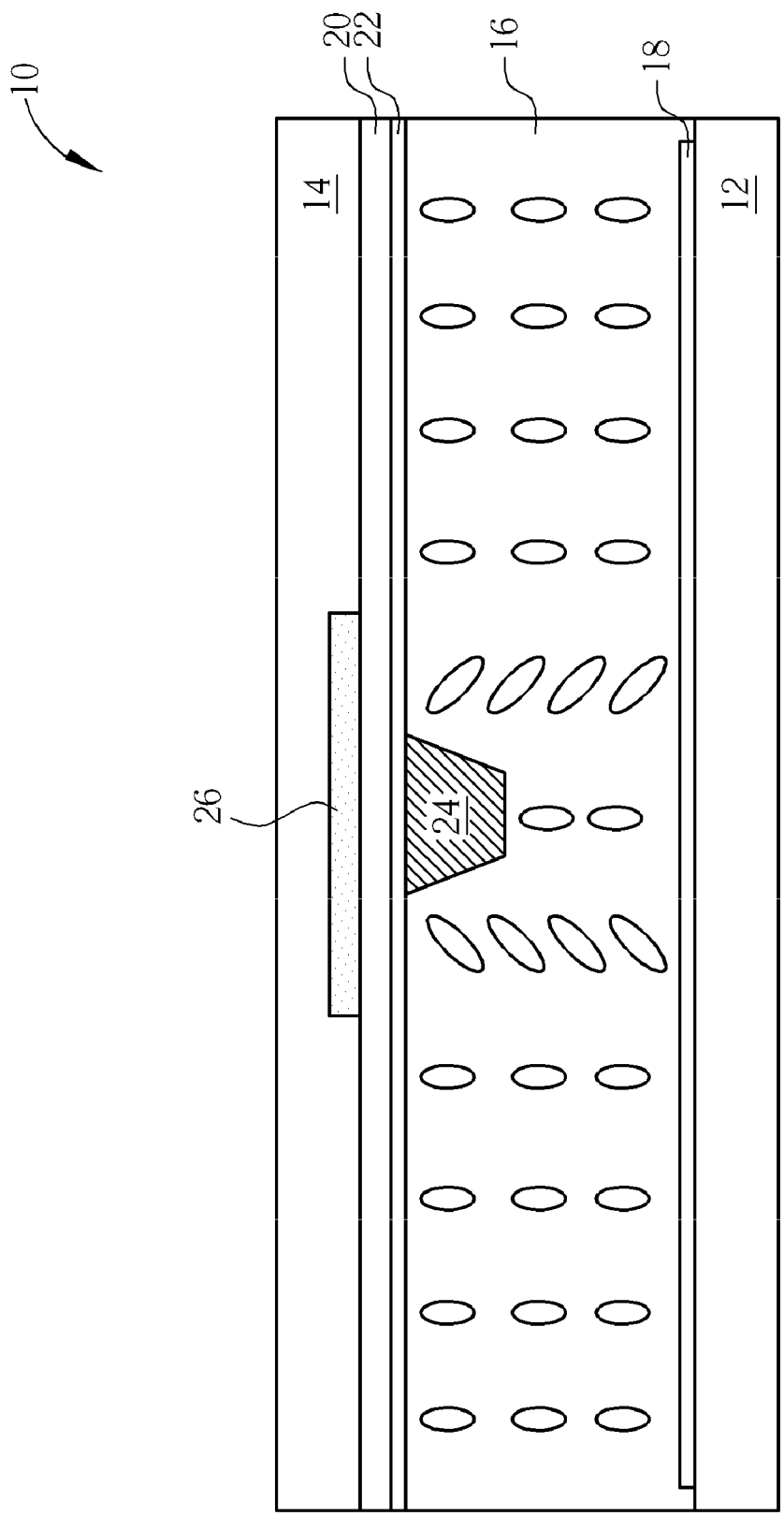
FIG. 1 is a schematic diagram illustrating a pixel structure of an MVA LCD panel according to the prior art.
Figure 2:
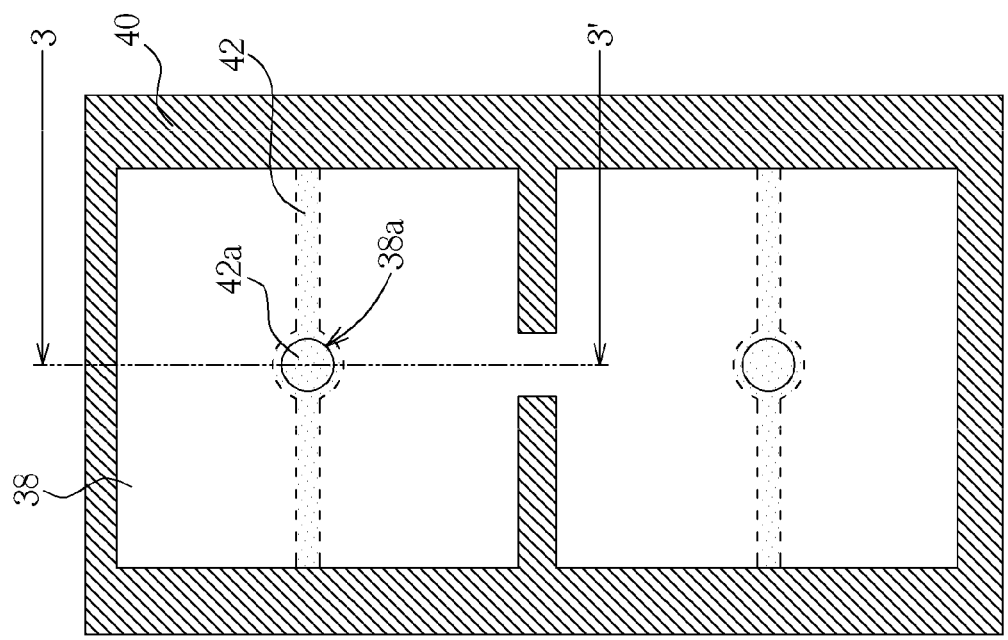
FIG. 2 and FIG. 3 are schematic diagrams illustrating a first preferred embodiment of a pixel structure of an MVA LCD panel of the present invention.
Figure 3:
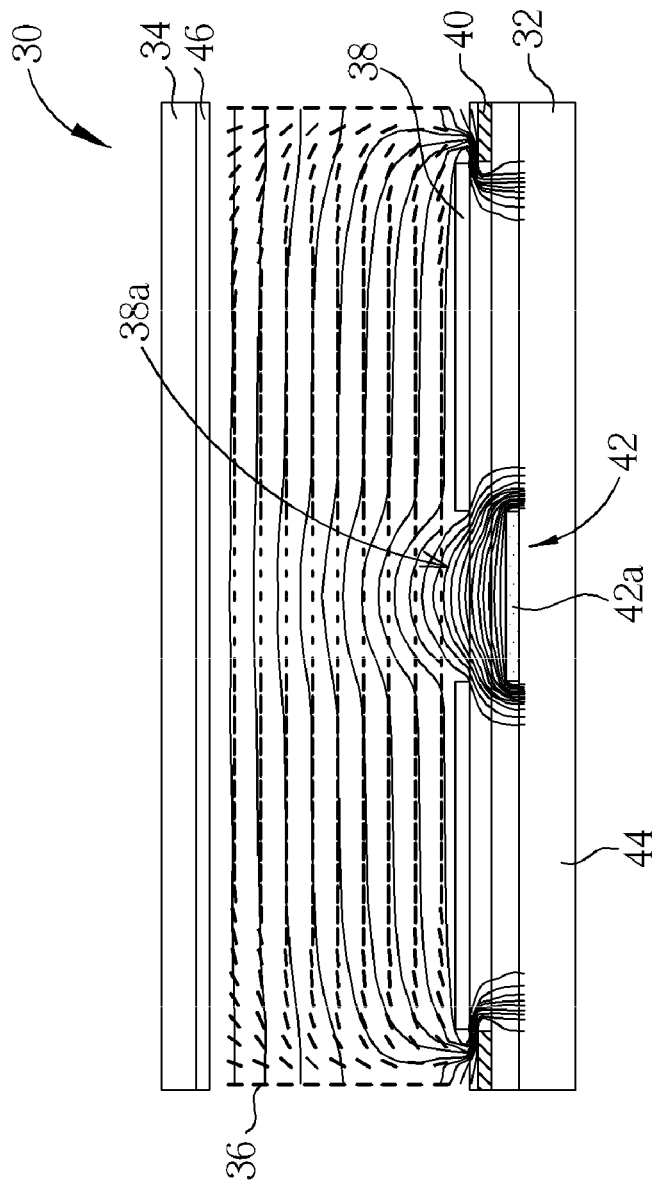

With reference to FIG. 2 and FIG. 3, FIG. 2 and FIG. 3 are schematic diagrams illustrating a first preferable embodiment of a pixel structure of the LCD panel of the present invention. FIG. 2 is a top view diagram, and FIG. 3 is a cross-sectional view diagram along a tangent line 33' illustrated in FIG. 2. In order to clearly show the characteristics of the present invention, only a single pixel structure of the LCD panel is shown in the drawings, and detailed as follows. As illustrated in FIG. 2 and FIG. 3, the LCD panel of the present embodiment is an MVA LCD panel. The pixel structure 30 of the MVA LCD panel includes a first substrate 32, a second substrate 34 and a liquid crystal layer 36. The first substrate 32 and second substrate 34 are disposed oppositely, and the liquid crystal layer 36 is disposed between the first substrate 32 and the second substrate 34. Both the first substrate 32 and the second substrate 34 are transparent substrates such as glass substrates, quartz substrates and plastic substrates. The first substrate 32 (also referred to as an array substrate or a thin film transistor substrate) includes at least a pixel electrode 38, at least a first common electrode 40 and at least an aligning electrode 42. The material of the pixel electrode 38 includes transparent conductive material such as indium tin oxide (ITO). The material of the first common electrode 40 and the aligning electrode 42 includes non-transparent conductive material such as metal, but not limited to. The pixel electrode 38 includes at least a central opening 38a, which may be a circular opening but not limited to. The first common electrode 40 disposed on the periphery of the pixel electrode 38 may surround the pixel electrode 38 in a ring-like arrangement. The first common electrode 40 is disposed under the pixel electrode 38, and the pixel electrode 38 does not overlap with the first common electrode 40. The aligning electrode 42 is disposed between the pixel electrode 38 and the first substrate 32, and the aligning electrode 42 includes an aligning part 42a disposed under the central opening 38a of the pixel electrode 38 and corresponding to the central opening 38a.

In the present embodiment, the aligning part 42a of the aligning electrode 42 has a circular pattern, and the size of the aligning part 42a is somewhat larger than that of the central opening 38a of the pixel electrode 38 so as to improve the alignment process window. The aligning part 42a of the aligning electrode 42 has a function of shielding light leakage. Also, at least a dielectric layer 44 is disposed between the pixel electrode 38 and the aligning electrode 42 so that the pixel electrode 38 and the aligning electrode 42 can be electrical disconnected. The pixel electrode 38 is electrically connected to the drain electrode (not shown in figure) of the thin film transistor, and the pixel electrode 38 can receive a pixel voltage transferred by the thin film transistor; the first common electrode 40 is supplied with a common voltage; and the aligning electrode 42 is supplied with an aligning voltage. The pixel electrode 38, the first common electrode 40 and the aligning electrode 42 are electrical disconnected to one another. The pixel voltage is able to drive the liquid crystal molecules to tilt so as to control gray scale. The aligning voltage applied to the aligning electrode 42 is provided for aligning the liquid crystal layer 36 so that an MVA effect can be created without an additional alignment protrusion arrangement. The common voltage of the first common electrode 40 can align the liquid crystal molecules disposed on the fringe of the pixel electrode 30, and accordingly the size of the aligning electrode 42 may be reduced. Beside, the arrangement of the first common electrode 40 can also expedite the response speed of the liquid crystal molecules.

The LCD panel of the present invention is a vertical alignment type. The aligning voltage applied to the aligning electrode 42 may be a fixed voltage, or the phase of the aligning voltage may be identical to that of the pixel voltage applied to the pixel electrode 38 (the aligning electrode 42 is synchronized with the pixel electrode 38, and therefore the aligning electrode 42 has a pulse voltage of the same high-voltage level and low-voltage level with the pixel electrode 38). The aligning voltage applied to the aligning electrode 42 is greater than the pixel voltage applied to the pixel electrode 38. For instance, an absolute value of the aligning voltage applied to the aligning electrode 42 is greater than an absolute value of the pixel voltage applied to the pixel electrode 38 in the range approximately from 2 to 15 voltages but not limited to. The amplitude of the aligning voltage can be adjusted according to the different thickness and different dielectric constant of the dielectric layer 44 so as to achieve preferable alignment effect. For instance, if the thickness of the dielectric layer 44 is thinner, the lower aligning voltage can be applied. On the contrary, if the thickness of the dielectric layer 44 is thicker, the higher aligning voltage can be applied. Furthermore, a second common electrode 46 can be further disposed on the surface of the second substrate 34 facing the first substrate 32.

In the present embodiment, the aligning electrode 42 and the first common electrode 40 are formed in different conductive layers. For instance, the aligning electrode 42 may be the third metal layer, and the first common electrode 40 may be the forth metal layer but not limited to. For instance, the aligning electrode 42 can be formed by the fourth metal layer, and the first common electrode 40 can be formed by the third metal layer, or both the aligning electrode 42 and the first common electrode 40 can be formed by the same metal layer. However, in the overlapping region, in order to prevent the electrical connection between the first common electrode and the aligning electrode, another conductive layer can be utilized as additionally electrical connection bridges so as to receive different electrical signals.

Figure 4:
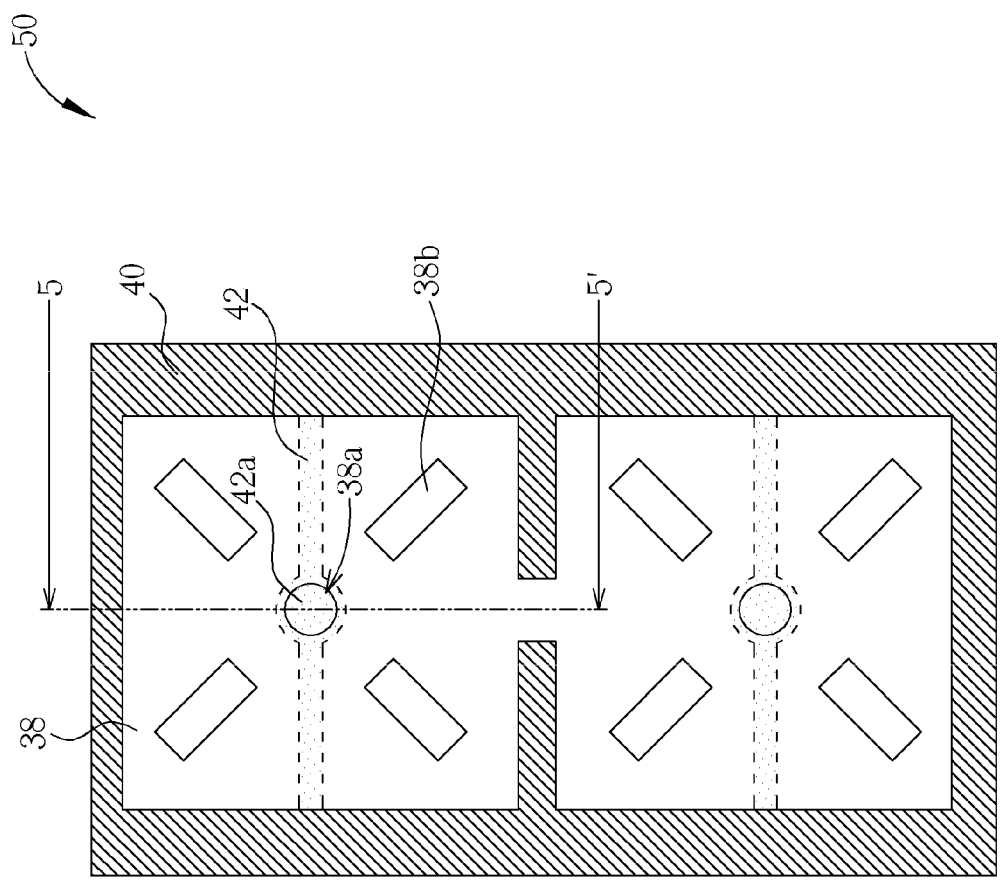
FIG. 4 and FIG. 5 are schematic diagrams illustrating a second preferred embodiment of a pixel structure of an MVA LCD panel of the present invention.
Figure 5:
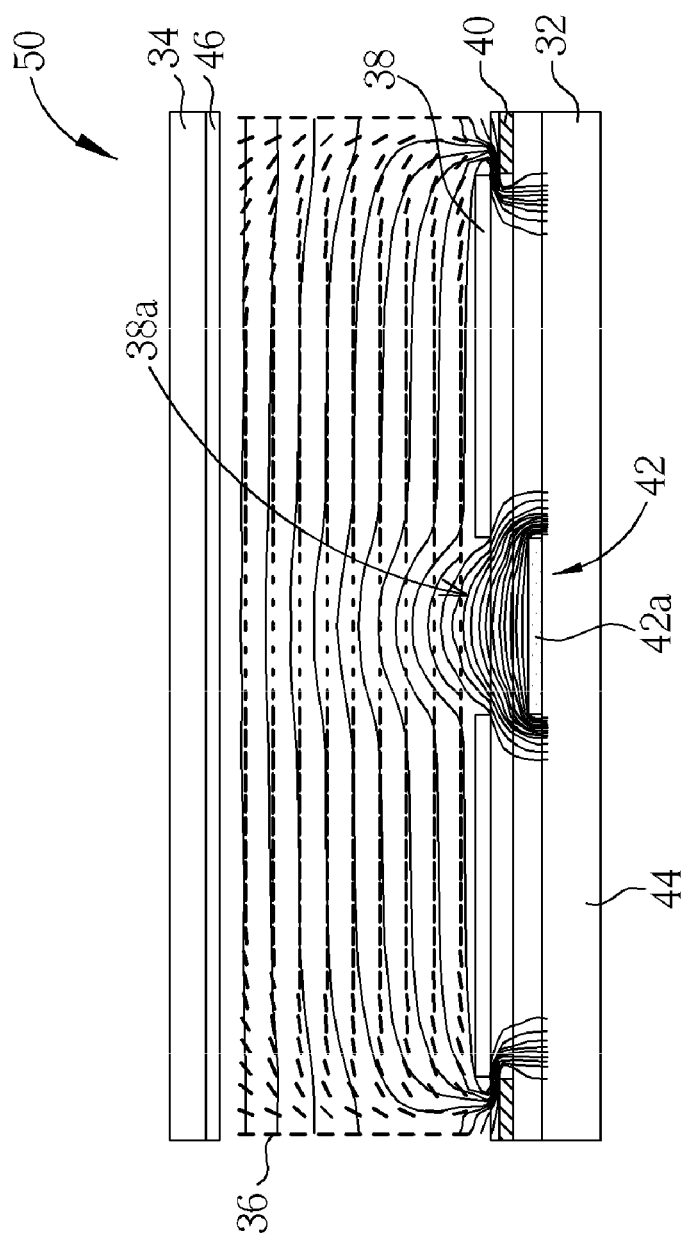

Except for the aforementioned first preferable embodiment of the present invention, several preferable embodiments are further detailed as follows in sequence. In order to compare the difference between the embodiments of the present invention with ease, the several embodiments illustrated in the accompanying drawings use the numbered elements identical to those already used in the aforementioned first preferred embodiment, and similar descriptions for those elements are not repeated in detail. With reference to FIG. 4 and FIG. 5, FIG. 4 and FIG. 5 are schematic diagrams illustrating a second preferable embodiment of a pixel structure of the LCD panel of the present invention. FIG. 4 is a top view diagram, and FIG. 5 is a cross-sectional view diagram along a tangent line 55' illustrated in FIG. 4. As illustrated in FIG. 4 and FIG. 5, the difference between the aforementioned first embodiment and the present second preferable embodiment is that the pixel electrode 38 of the pixel structure 50 of the LCD panel of the present embodiment further includes at least a slit opening 38b, and one edge of the slit opening 38b is adjacent to the central opening 38a. For instance, the pixel electrode 38 can preferably include a plurality of slit openings 38b disposed peripherally with respect to the central opening 38a in a radiating arrangement. The object of the arrangement of the slit openings 38b is to further enhance alignment effect and reduce the response time of the liquid crystal molecules. The shape, numbers and arrangement of the slit openings 38b can be changed according to alignment effect but not limited to the preferable embodiment illustrated in FIG. 4.

Figure 6:
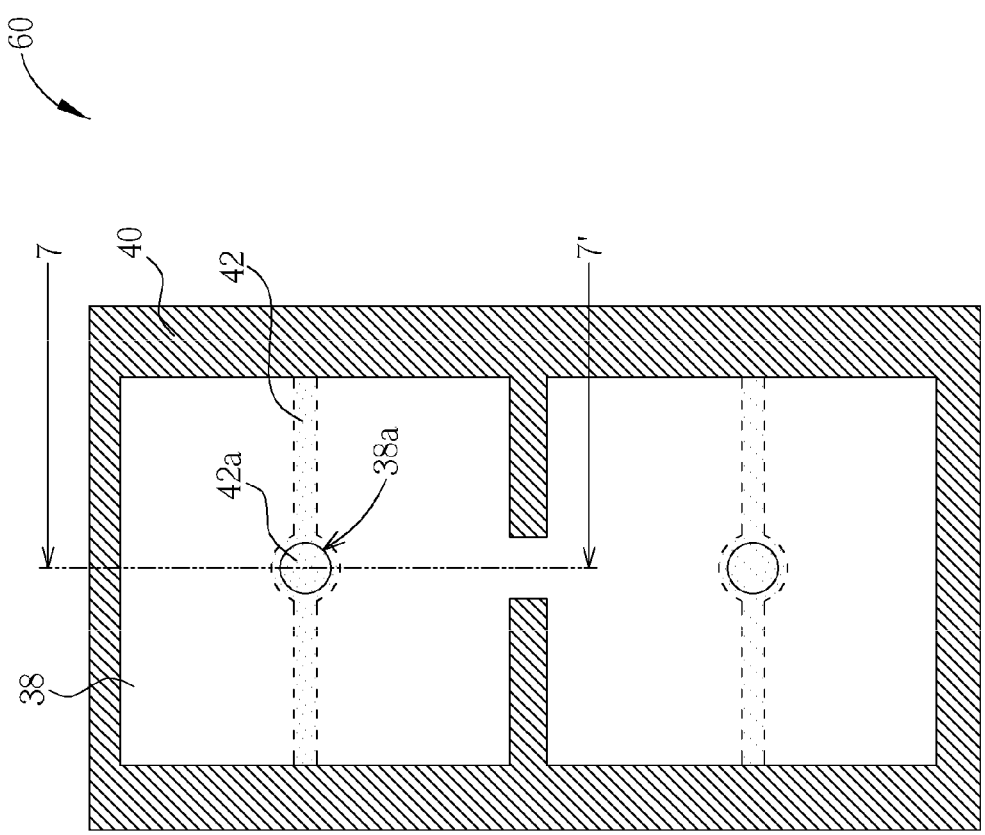
FIG. 6 and FIG. 7 are schematic diagrams illustrating a third preferred embodiment of a pixel structure of an MVA LCD panel of the present invention.
Figure 7:
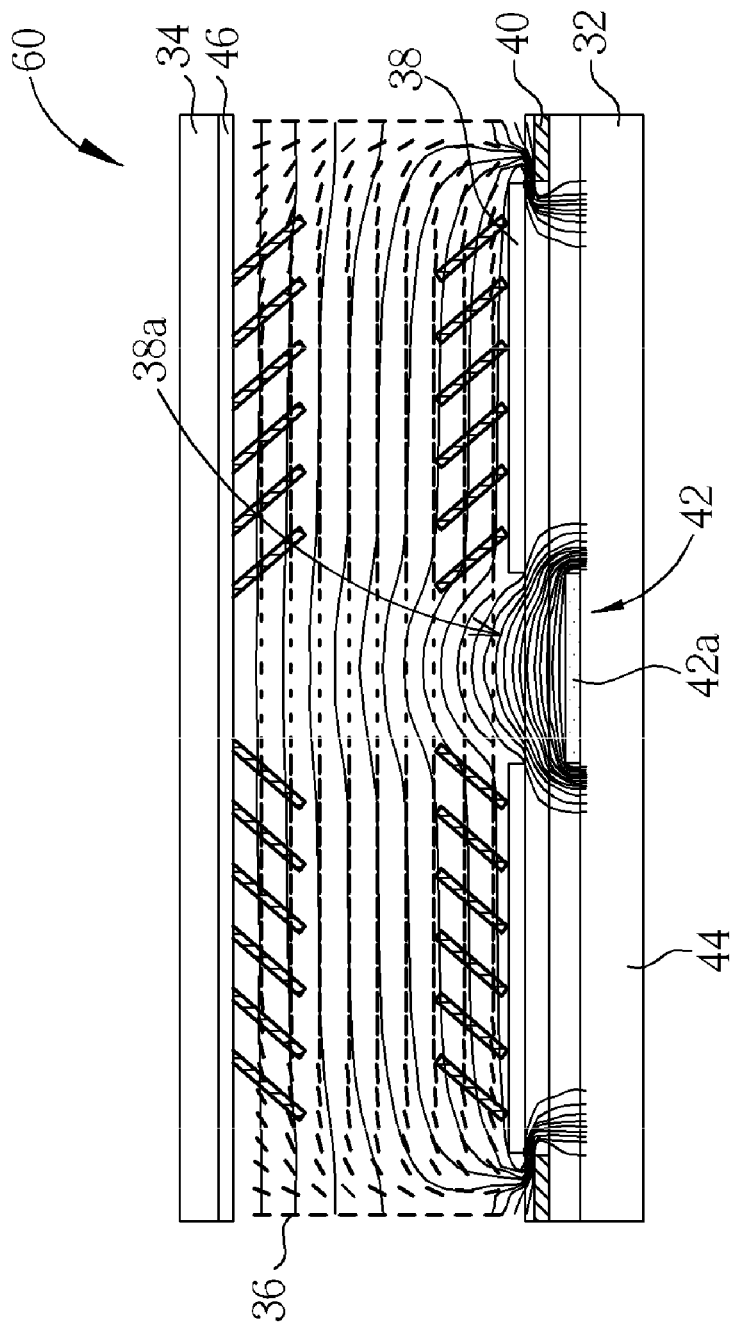

With reference to FIG. 6 and FIG. 7, FIG. 6 and FIG. 7 are schematic diagrams illustrating a third preferable embodiment of a pixel structure of the LCD panel of the present invention. FIG. 6 is a top view diagram, and FIG. 7 is a cross-sectional view diagram along a tangent line 77' illustrated in FIG. 6. As illustrated in FIG. 6 and FIG. 7, the difference between the aforementioned first embodiment and the present third embodiment is that the pixel structure 60 of the LCD panel of the present embodiment includes a plurality of polymer stability alignment 62 disposed on the pixel electrode 38 so as to form an adjuvant alignment layer disposed on one side of the pixel electrode 38 facing the second substrate 34. The polymer stability alignment 62 is also disposed on one side of the second substrate 34 facing the first substrate. The polymer stability alignment 62 is aligned by applying an additional stabilized voltage thereon, and the monomers are polymerized by using irradiation such as UV irradiation. The polymer stability alignment accordingly has advantages of the enhancement of the alignment effect and the decreasing response time of the liquid crystal molecules.

Figure 8:
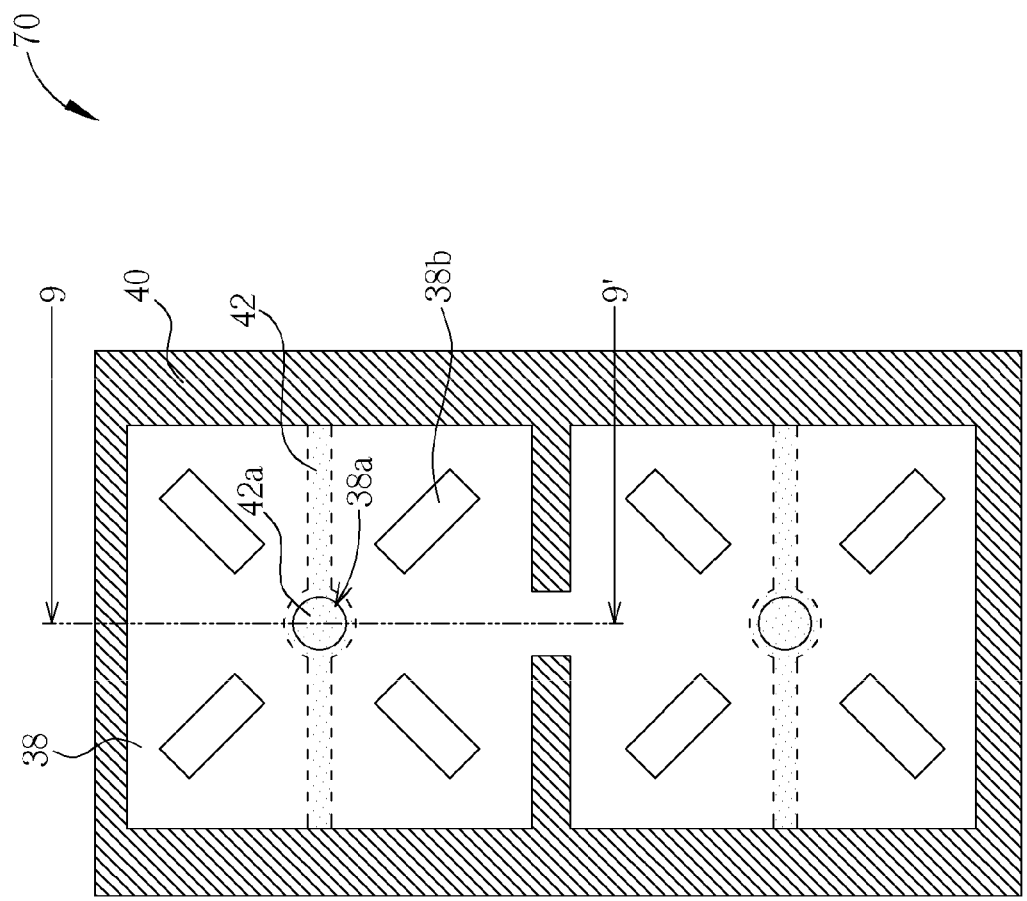
FIG. 8 and FIG. 9 are schematic diagrams illustrating a fourth preferred embodiment of an MVA LCD panel of the present invention.
Figure 9:
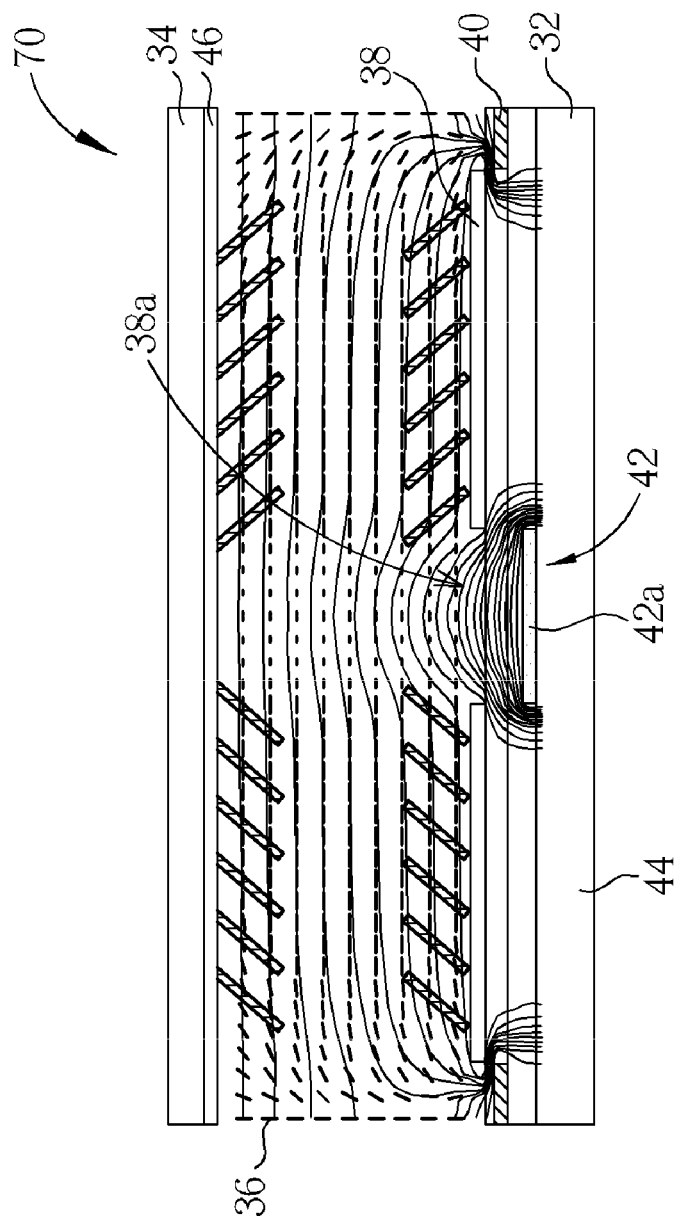

With reference to FIG. 8 and FIG. 9, FIG. 8 and FIG. 9 are schematic diagrams illustrating the fourth preferable embodiment of the pixel structure of the LCD panel of the present invention. FIG. 8 is a top view diagram and FIG. 9 is a cross-sectional view diagram along a tangent line 99' illustrated in FIG. 8. As illustrated in FIG. 8 and FIG. 9, the pixel structure 70 of the LCD panel of the present embodiment includes a plurality of polymer stability alignments 62 disposed both on the side of the pixel electrode 38 facing the second substrate 34 and on the side of the second substrate 34 facing the first substrate 32 so as to enhance alignment ability. Besides, the pixel electrode 38 includes a plurality of slit openings 38b disposed peripherally with respect to the central opening 38a in a radiating arrangement so as to further improve the alignment effect.

Figure 10A:
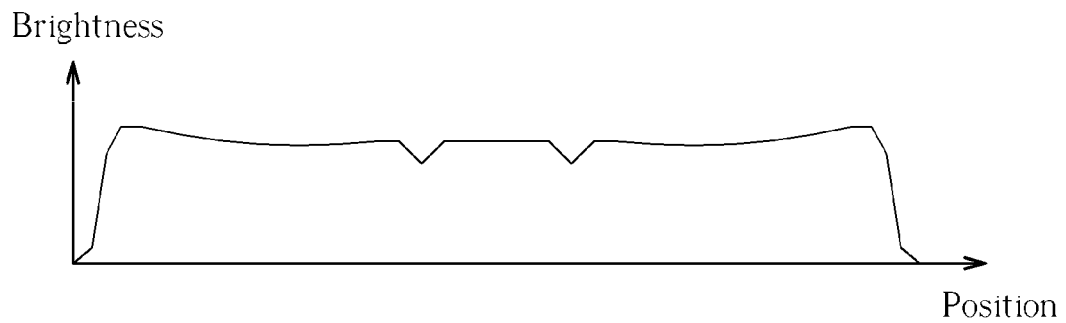
FIG. 10A depicts a brightness distribution diagram of the pixel structure of the present invention in the on-state mode.
Figure 10B:
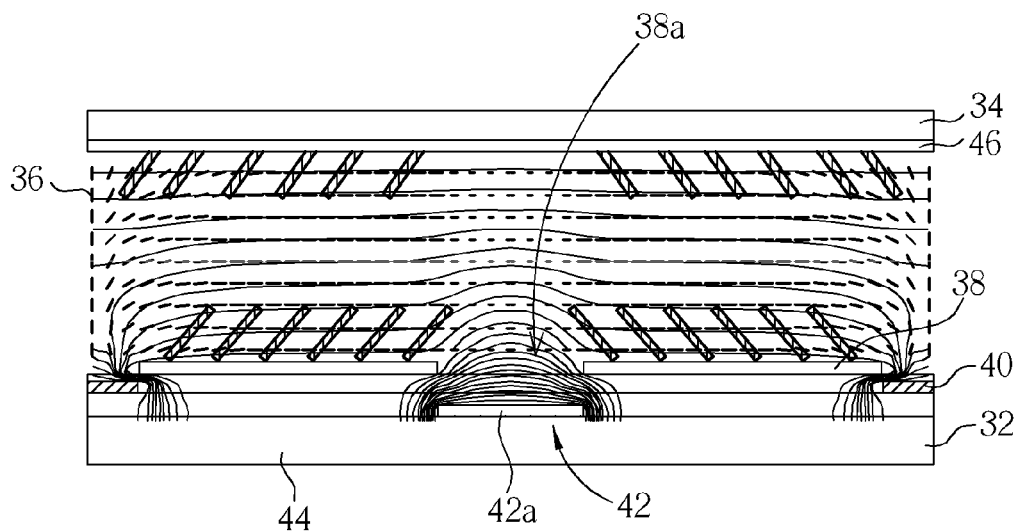
FIG. 10B is a schematic diagram illustrating the arrangement of liquid crystal molecules and equipotential line distribution of the pixel structure of the present invention in the on-state mode.
Figure 11A:
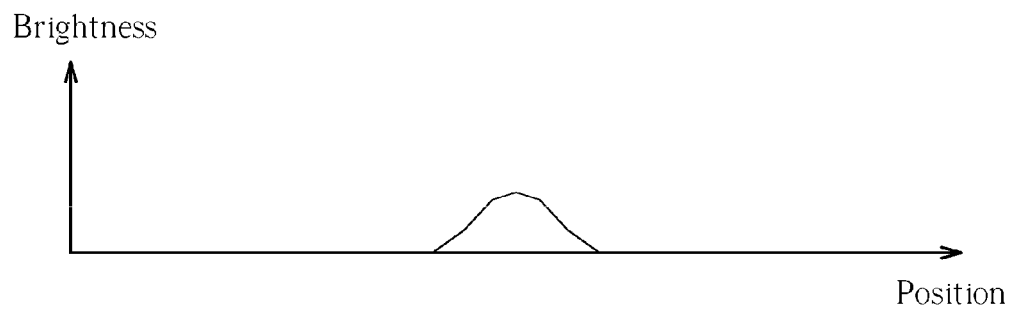
FIG. 11A depicts a brightness distribution diagram of the pixel structure of the present invention in the off-state mode.
Figure 11B:
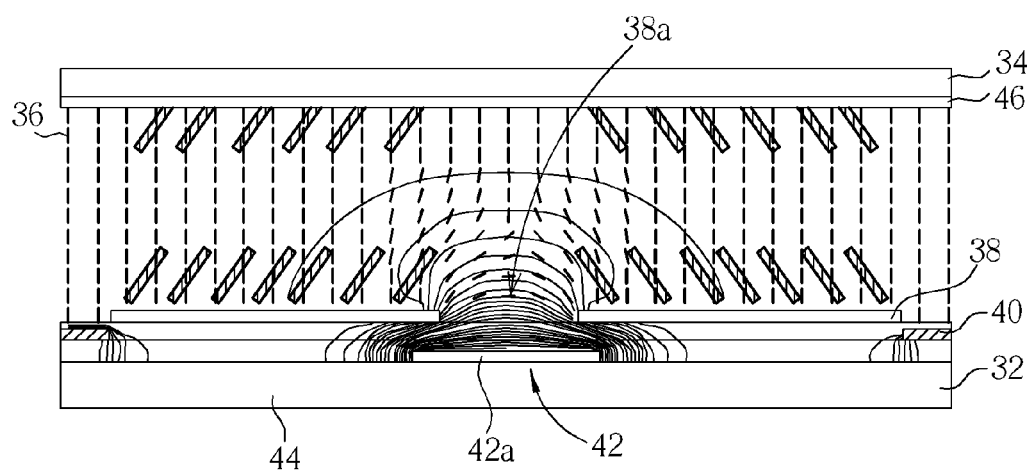
FIG. 11B a schematic diagram illustrating the arrangement of liquid crystal molecules and equipotential line distribution of the pixel structure of the present invention in the off-state mode.

With reference to FIG. 10A, FIG. 10B, FIG. 11A and FIG. 11B, FIG. 10A depicts a brightness distribution diagram of the pixel structure of the present invention in the on-state mode, FIG. 10B is a schematic diagram illustrating the arrangement of liquid crystal molecules and equipotential line distribution of the pixel structure of the present invention in the on-state mode, FIG. 11A depicts a brightness distribution diagram of the pixel structure of the present invention in the off-state mode, and FIG. 11B a schematic diagram illustrating the arrangement of liquid crystal molecules and equipotential line distribution of the pixel structure of the present invention in the off-state mode. For instance, when the pixel structure is in the on-state mode, the pixel voltage applied to the pixel electrode 38 is about 5 voltages, the common voltage applied to the first common electrode 40 and the second common electrode 46 is about 0 voltage, and the aligning voltage applied to the aligning electrode 42 is about 12 voltages. As illustrated in FIG. 10B, by virtue of the installation of the aligning electrode 42 and the first common electrode 40, the distribution of the equipotential lines can facilitate liquid crystal molecules to have an enhanced MVA effect when the pixel structure in the on-state mode. As illustrated in FIG. 10A, the pixel structure can irradiate uniformly-distributed lights when the pixel structure in the on-state mode. As illustrated in FIG. 11B, for instance, when the pixel structure is in the off-state mode, the pixel voltage applied to the pixel electrode 38 is about 0 voltage, the common voltage applied to both the first common electrode 40 and the second common electrode 46 is about 0 voltage, and the aligning voltage applied to the aligning electrode 42 is about 12 voltages. Since the liquid crystal molecules corresponding to the aligning electrode 42 are tilted due to the existence of the aligning electrode 42, the liquid crystal molecules corresponding to the aligning electrode 42 will allow some lights to penetrate therethrough. However, the aligning electrode 42 made of non-transparent material may shield the lights. Accordingly, as illustrated in FIG. 11A, the pixel structure does not have light leakage phenomenon in the off-state mode.

In summary, the pixel structure of the LCD panel of the present invention has following advantages:

Since the pixel structure of the present invention utilizes the aligning electrode to perform a multi-domain alignment, an additional arrangement of the alignment protrusion is needless. As a consequence, the goal to cost down can be achieved.

The pixel structure of the present invention utilizes the first common electrode for aligning on the fringe of the pixel structure. Accordingly, a significant overall alignment effect and a faster response time can be achieved. The arrangement of the first common electrode enables the size reduction of the aligning electrode, and consequently improves the aperture ratio of the pixel structure.

Since the manufacturing process limitation in both the aligning electrode and the pixel electrode is higher than that in the alignment protrusion, the resolution is not influenced in spite of the aligning electrode arranged in a high-resolution LCD panel.

The polymer stability alignment can be selectively disposed on the pixel structure of the present invention so as to improve the alignment ability and improve the response speed.

Those skilled in the art will readily observe that numerous modifications and alterations of the device and method may be made while retaining the teachings of the invention.

What is claimed is:

1. A pixel structure, disposed on a substrate, the pixel structure comprising:
    at least a pixel electrode disposed on the substrate, and the pixel electrode having a central opening;
    at least a common electrode disposed on the periphery of the pixel electrode of the substrate; and
    at least an aligning electrode disposed between the pixel electrode and the substrate, the aligning electrode including an aligning part disposed under and corresponding to the central opening;
    wherein an aligning voltage applied to the aligning electrode is greater than a pixel voltage applied to the pixel electrode.

2. The pixel structure of claim 1, wherein an absolute value of the aligning voltage applied to the aligning electrode is greater than an absolute value of the pixel voltage applied to the pixel electrode in the range approximately from 2 to 15 voltages.

3. The pixel structure of claim 1, wherein the phase of the aligning voltage applied to the aligning electrode is identical to that of the pixel voltage applied to the pixel electrode.

4. The pixel structure of claim 1, wherein the pixel electrode further comprises at least a slit opening, and one edge of the silt opening is adjacent to the central opening.

5. The pixel structure of claim 3, wherein the pixel electrode has a plurality of slit openings disposed peripherally with respect to the central opening in a radiating arrangement.

6. The pixel structure of claim 1, wherein the pixel electrode further comprises a plurality of polymer stability alignments disposed thereon.

7. The pixel structure of claim 1, wherein the aligning part of the aligning electrode disposed on the central opening has a circular pattern.

8. The pixel structure of claim 1, wherein a material of the aligning electrode comprises metal.

9. The pixel structure of claim 1, wherein a material of the aligning electrode comprises a non-transparent conductive material.

10. The pixel structure of claim 1, further comprising a dielectric layer disposed between the pixel electrode and the aligning electrode.

11. The pixel structure of claim 1, wherein a material of the common electrode comprises metal.

12. The pixel structure of claim 1, wherein the common electrode surrounds the pixel electrode in ring-like arrangement.

13. The pixel structure of claim 1, wherein a material of the pixel electrode comprises a transparent conductive material.

14. The pixel structure of claim 1, wherein the pixel electrode, the common electrode and the aligning electrode are electrically disconnected.

15. A pixel structure, disposed on a substrate, the pixel structure comprising:
at least a pixel electrode disposed on the substrate, and the pixel electrode having a central opening; and
at least an aligning electrode disposed between the pixel electrode and the substrate, and the aligning electrode comprising an aligning part disposed under and corresponding to the central part;
wherein an aligning voltage applied to an aligning electrode is greater than a pixel voltage applied to a pixel electrode.

16. A liquid crystal display (LCD) panel, comprising:
a first substrate comprising:
at least a pixel electrode disposed on the first substrate, and the pixel electrode having a central opening;
at least a first common electrode disposed on the periphery of the pixel electrode of the first substrate; and
at least an aligning electrode disposed between the pixel electrode and the first substrate, and the aligning electrode comprising an aligning part disposed under and corresponding to the central opening.
wherein an aligning voltage applied to an aligning electrode is greater than a pixel voltage applied to a pixel electrode;
a second substrate disposed opposite to the first substrate, and the second substrate comprising a second common electrode corresponding to the pixel electrode; and
a liquid crystal layer disposed between the first substrate and the second substrate.

17. The LCD panel of claim 16, wherein an absolute value of the aligning voltage applied to the aligning electrode is greater than an absolute value of the pixel voltage applied to the pixel electrode in the range approximately from 2 to 15 voltages.

18. The LCD panel of claim 16, wherein the phase of the aligning voltage applied to the aligning electrode is identical to that of the pixel voltage applied to the pixel electrode.

19. The LCD panel of claim 16, wherein the pixel electrode further comprises at least a slit opening and one edge of the silt opening is adjacent to the central opening.

20. The LCD panel of claim 19, wherein the pixel electrode has a plurality of slit openings disposed on the periphery of the central opening in a radiating arrangement.

21. The LCD panel of claim 16, further comprising a plurality of polymer stability alignment layer disposed on one side of the pixel electrode facing the second substrate.

22. The LCD panel of claim 16, wherein the aligning part of the aligning electrode disposed on the central opening has a circular pattern.

23. The LCD panel of claim 16, wherein a material of the aligning electrode comprises metal.

24. The LCD panel of claim 16, wherein a material of the aligning electrode comprises a non-transparent conductive material.

25. The LCD panel of claim 16, further comprising a dielectric layer disposed between the pixel electrode and the aligning electrode.

26. The LCD panel of claim 16, wherein a material of the common electrode comprises metal.

27. The LCD panel of claim 16, wherein the common electrode surrounds the pixel electrode in a ring-like arrangement.

28. The LCD panel of claim 16, wherein a material of the pixel electrode comprises a transparent conductive material.

29. The LCD panel of claim 16, wherein the pixel electrode, the common electrode and the aligning electrode are electrically disconnected.

* * * * *